United States Patent [19]
Fischer et al.

[11] 3,909,472
[45] Sept. 30, 1975

[54] PLASTICS ADDITIVES IN THE FORM OF SUBSTANTIALLY HOMOGENEOUS GRANULES AND PROCESS FOR MAKING THE SAME

[75] Inventors: Julius F. Fischer, Ferguson; Daniel F. Scully, Woodson Terrace, both of Mo.

[73] Assignee: Mallinckrodt, Inc., St. Louis, Mo.

[22] Filed: May 14, 1973

[21] Appl. No.: 360,036

[52] U.S. Cl............ 260/23 XA; 106/230; 106/231; 106/240; 106/241; 106/243; 106/270; 106/272; 252/1; 252/364; 252/400 R; 252/407; 260/27 R; 260/28; 260/28.5 AV; 260/30.8 R
[51] Int. Cl.² ............... C08L 91/00; C08L 91/06; C08L 93/00; C09K 3/00
[58] Field of Search ....... 260/23 XA, 28, 28.5 AV, 260/27 R, 30.8 R; 252/400 R, 407, 1, 364; 106/230, 231, 240, 241, 243, 270, 272

[56] References Cited
UNITED STATES PATENTS

| | | | |
|---|---|---|---|
| 1,932,889 | 10/1933 | Groff | 106/1.5 |
| 2,275,957 | 3/1942 | Groff | 260/23 XA |
| 2,275,957 | 3/1942 | Groff | 260/23 XA |
| 2,307,092 | 1/1943 | Yngve | 260/23 XA |
| 3,635,858 | 1/1972 | Shiratori | 260/23 XA |
| 3,705,137 | 12/1972 | Kuwahara | 260/23 XA |
| 3,779,962 | 12/1973 | Koenen | 260/23 XA |
| R27,121 | 4/1971 | Canarios | 260/23 XA |

*Primary Examiner*—Donald E. Czaja
*Assistant Examiner*—H. H. Fletcher
*Attorney, Agent, or Firm*—John D. Pope, III

[57] ABSTRACT

Substantially homogeneous granular additives containing a plurality of microingredients for a vinyl-based polymer, e.g., polyvinyl chloride, are prepared by precipitating a water-insoluble saponaceous salt, e.g., calcium stearate, from an aqueous medium having other microingredients suspended therein. The precipitated saponaceous salt serves to coalesce and bind the other microingredients and it also functions as a lubricant in polymeric resin compounds.

12 Claims, No Drawings

3,909,472

PLASTICS ADDITIVES IN THE FORM OF SUBSTANTIALLY HOMOGENEOUS GRANULES AND PROCESS FOR MAKING THE SAME

BACKGROUND OF THE INVENTION

1. Field of the Invention

This invention relates to vinyl-based polymer resins and more particularly to novel additive compositions therefor.

2. Description of the Prior Art

Various vinyl-based polymers, such as poly-vinyl chloride (PVC), are widely used in the manufacture of plastic articles by extrusion, blowing or injection molding. In order for these manufacturing techniques to be feasible, the polymer must be formulated with various additives such as stabilizers, lubricants, plasticizers, impact modifiers, and other processing aids including fillers and pigments. The kind and proportion of such additives vary widely depending upon the method of manufacture and the intended use for the plastic article. However, the proportions of these additives relative to the basic resin is usually very small and hence they are commonly referred to as "microingredients" and will be so referred to herein.

For convenience in handling and adding small quantities of these additives, various concentrates containing a plurality of these microingredients have been devised. For example, such concentrates commonly comprise a heterogeneous mixture of some or all of the required microingredients. Such mixtures are liable to separation and segregation of the individual components within the mixtures, thus lessening the accuracy with which the addition of individual microingredients can be controlled.

Uniformly dispersing heterogeneous mixtures in polymeric resins can be difficult and troublesome, and many fabricators of plastic articles lack the means to perform an operation of this kind satisfactorily. In that case, the fabricator purchases and uses a resin "compound", i.e., a resin which has the necessary microingredients incorporated therein. These compounds are prepared by initially mixing the microingredients with the dry powdered resin. The resulting heterogeneous compound is subject to possible separation and segregation just as in the case of heterogeneous microingredient mixtures. To avoid this problem the heterogeneous compound is sometimes fused and pelletized. While the resulting compounds are homogeneous, the resin must then be fused a second time and such multiple exposure of the polymeric resin to elevated temperatures has an adverse effect on the physical properties of the finished plastic. There is therefore still a need for homogeneous poly-functional plastics additives which can be readily and uniformly dispersed in a molten polymeric resin.

As used herein the term "vinyl-based polymers" broadly covers polymers and copolymers of vinyl compounds including but not limited to vinyl chloride, vinyl acetate and similar esters, vinylidene chloride and the like.

SUMMARY OF THE INVENTION

Among the objects of the present invention may be noted the provision of novel polyfunctional additive compositions for vinyl-based polymer formulations in the form of dry, substantially homogeneous granules; the provision of additive compositions comprising a plurality of essential microingredients, one or more of which may ordinarily be liquid or a low-melting solid; the provision of additive compositions of the character described which are readily and conveniently dispersible in the polymer formulations in easily controlled amounts; the provision of additive compositions of the character described which are free from other ingredients which are non-functional in the resin formulation; and the provision of methods for preparing additive compositions of the character described. Other objects and features will be in part apparent and in part pointed out hereinafter.

The invention accordingly comprises the product and methods hereinafter described, the scope of the invention being indicated in the following claims.

According to the present invention homogeneous granular additives containing a plurality of microingredients for vinyl resin formulations are obtained by precipitating a water-insoluble saponaceous salt from an aqueous medium containing other microingredients dispersed therein. The saponaceous salt acts as a coalescing agent and binder for these other microingredients and as a lubricant in the final plastic. The other microingredients may include stabilizers, lubricants, plasticizers, impact modifiers and other processing aids including fillers and pigments, and they may be either liquid or solid in their original state.

More particularly the additives of the present invention are prepared by gradually adding a molten acid capable of forming a saponaceous salt toa stirred suspension or solution containing a basic compound of the desired cation. The other microingredients may be dispersed in either the molten acid or the aqueous suspension. The precipitated salt containing the other microingredients incorporated therein is readily filtered, dried and milled to the desired particle size to yield a dry granular polyfunctional additive of substantially homogeneous composition.

DESCRIPTION OF THE PREFERRED EMBODIMENTS

The present invention is based upon the discovery that when a water-insoluble saponaceous salt is precipitated from an aqueous medium containing other essential microingredients, the soap acts as a coalescing agent and binder to form a homogeneous granular composition containing all the other essential microingredients present in the precipitation medium and in essentially the same proportions. The invention is substantially independent of the form in which the other microingredients are present in the precipitation medium. They may be present as an emulsion or other liquid dispersion or as suspended solids. It will be evident that the more finely and uniformly the microingredients are dispersed in the precipitation medium the more homogeneous will be the granular product. Methods for achieving such homogeniety will be described hereinafter. Since metal soaps are now extensively used as internal lubricants in vinyl plastics, the additive compositions of this invention do not require addition of any substances which are non-functional in the final resin formulation.

The saponaceous salt may comprise as little as about 10% by weight of the total additive and still effectively perform its twin functions as coalescing agent and binder. If, on the other hand, the additive composition contains but one other microingredient, the saponaceous salt may comprise as much as 95% or more of the granular additive.

As used herein, the term "spaonaceous salt" includes any water-insoluble salt of a higher aliphatic acid capable of functioning as a lubricant in polyvinyl plastic materials. Among the most commonly used of these soap acids are the higher saturated fatty acids, either straight-chain or branched-chain, containing 6–35 carbon atoms, especially stearic acid or its naturally-occurring mixtures with other fatty acids. Other non-fatty acids of equivalent molecular weight such as the resin acids, e.g., abietic acid, and alkyl sulfonic acids, e.g., lauryl-sulfonic acid, are also capable of forming useful saponaceous salts. Among the cations which form useful saponaceous salts, as hereinbefore defined, are the alkaline earth matals, especially calcium and magnesium, and the heavy metals, such as aluminum. Other heavy metals such as barium, cadmium, lead, tin and zinc are of special interest because they are known to have a stabilizing effect on polyvinyl resins and therefore the salt may also advantageously comprise such stabilizing cations.

Among the many and varied microingredients which can advantageously be incorporated in the granular additives of the present invention may be noted the following. These are cited for illustrative purposes only and it is not intended that the invention should be limited to any of these particular examples of any particular combination thereof.

Numerous waxes or wax-like substances are frequently used as external lubricants, i.e., to impart surface lubricity to the plastic during and after processing. Such waxy materials include the naturally occurring waxes such as carnauba, candelilla, japan and beeswax, paraffin waxes from petroleum residues, various polyhydroxy alcohol esters such as sorbitor mono- or distearate and the like, fatty acid esters and amides, and synthetic waxes such as polyoxyethylene glycol, low molecular weight polyethylene, and oxidized polyethylene.

Another important class of microingredients are numerous stabilizer compounds and compositions. These include heat stabilizers such as combinations or barium and cadmium salts, as well as numerous other commercial stabilizers based on organic tin compounds such as di-butyl tin bis (iso octyl mercaptoacetate), dioctyl tin laurate, dioctyl tin maleate and monoalkyl tin compounds. The stabilizer groups also includes numerous anti-oxidants and UV absorbers.

Also included are polymeric impact modifiers and processing aids such as those based on acrylic and methacrylic acid, plasticizers, fillers, pigments and the like.

The following examples illustrate the invention.

EXAMPLE 1

The following illustrates a simple embodiment of this invention wherein a metal soap is combined with a waxy external lubricant to form a homogeneous granular additive.

To 276 g. of molten commercial "stearic" acid (more specifically a hydrogenated tallow acid) is added 15 g. of a commercial high density polyethylene wax ("Polywax 2000" supplied by Petrolite Corporation) having a melting point of about 121°C. The resulting dispersion is then slowly added (30 minutes) with stirring to a suspension of 41 g. $Ca(OH)_2$ in 1500 cc. of water at 55°–90°C. and the resulting mixture is digested at 75°–85°C. for an additional 30 minutes. The resulting granular precipitate is easily filtered off and since it has a softening point of about 120°C. it can be dried and milled to any desired particle size. The granular product is also substantially homogeneous and contains essentially all of the waxy lubricant starting material.

The wax in the above preparatin can be replaced by paraffin wax with comparable results.

EXAMPLE 2

The simple additive described in Example 1 is easily expanded to incorporate other useful microingredients.

Paraffin wax (30 g.) and 30 g. of a liquid commercial tin stabilizer ("Thermolite No. 31" supplied by M & T Chemicals, Inc.) are dispersed in 276 g. of hydrogenated tallow acids. This solution is slowly added (45 minutes) to a suspension of 42 g. $Ca(OH)_2$ in 1500 cc. water maintained at 55°–60°C. The slurry is digested at 60°–85°C. for an additional 15–30 minutes to give an easily filterable suspension. When dried at 70°C. the granular additive contains 83% calcium soap and essentially all the other microingredients starting materials.

EXAMPLE 3

The other microingredients may be added to the aqueous base suspension as well as the molten soap acid as in the following example.

Paraffin wax (42.6 g.) and the liquid tin stabilizer described in Example 2 (85.2 g.) are dispersed in 42.6 g. of molten hydrogenerated tallow acids. The resulting molten solution is gradually added (30–45 minutes) to a stirred aqueous suspension containing 6.3 g. $Ca(OH)_2$ and 128.4 g. of a commercial solid acrylic-based processing aid ("Acryloid K-120N" supplied by Rohm & Hass Co.) in 1000 ml. of water maintained at 55°–60°C. The mixture was digested at the same temperature for an additional hour to yield an easily filterable granular precipitate. When dried at 70°C. a white free-flowing powder was obtained which comprised 15% calcium soap and essentially all the added microingredients.

EXAMPLE 4

The acrylic-based processing aid may be added as an aqueous emulsion rather than solid form as described in Example 3.

Paraffin wax (48 g.) is dispersed in 48 g. hydrogenated tallow acids and this is gradually added (1 hour) to a stirred suspension containing 7.5 g. $Ca(OH)_2$ and 192.3 g. of a 42% aqueous emulsion of an acrylic-based polymer, similar in chemical composition to that used in Example 3, in 1000 cc. of water maintained at 50°–60°C. The mixture is then digested at 70°–85°C. for an additional 15–30 minutes to yield an easily filterable product. The dried granular composition comprised 29% calcium soap having homogeneously incorporated therein essentially all of the other added microingredients.

If desired, stabilizers or other microingredients may be added to the composition in the manner described in the preceding examples.

EXAMPLE 5

One or more of the microingredients, e.g., a tin stabilizer, may be added after the calcium stearate or other saponaceous salt is preceipitated as in the following example.

Paraffin wax (48 g.) is dispersed in 48 g. hydrogenated tallow acids and this is gradually added (1 hour) to a stirred suspension containing 7.5 g. Ca(OH)$_2$ and 192.3 g. of a 40% aqueous emulsion of an acrylic-based polymer, similar in composition to that used in Example 3, in 1000 cc. of water maintained at 50°–70°C. The mixture is then digested at 70°C. for an additional 15–30 minutes to a pH of 7–8. To this slurry is added gradually 20 g. of liquid tin stabilizer consisting primarily of dibutyltin bis-S,S'isooctylthio-glycolate and digested at 70°C. for 30 minutes. The easily filterable product is dried, resulting in a dry granular composition. The resulting composition appeared to be equivalent in all respects to the composition described in Example 4.

EXAMPLE 6

The presence of a waxy lubricant, as in the preceding examples, is not essential. As shown in the following example the calcium stearate or other insoluble saponaceous salt also functions as a coalescing agent and binder in the absence of such a wax.

To 1000 cc. of water is added 192.43 g. of a 40% aqueous emulsion of an acrylic-based polymer, similar in chemical composition to that used in Example 3, and the temperature raised to 70°C. To this is added 9.54 g. of Ca(OH)$_2$ followed by the gradual addition of 71.1 g. of molten hydrogenated tallow fatty acids (iodine value = 1.6). The slurry is then digested at 70°–80° C. for 1 hour to yield a readily filterable granular product. The dried product contains 50% calcium stearate.

The additive compositions of the present invention are readily dispersible in molten polymeric resins. Owing to the intimate association between the saponaceous salt and other microingredient components, the former assists in the dispersion of the other micoringredients including those which are difficult to disperse uniformly if added separately. For example, the dry granular additive may be mixed with dry powdered resin after which the resulting mixture is fused. Conversely, the additive can be added directly to the molten resin whereupon fusion and dispersion of the saponaceous salt causes rapid dispersion of the other microingredients. The effect of the microingredients when added in the form of the granular homogeneous compositions of the present invention is equivalent to their effect if added separately, but uniform dispersion of the microingredients is more easily and quickly achieved.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A method for preparing a granular and substantially homogeneous polyfunctional additive for vinyl-based polymers which comprises precipitating a water-insoluble saponaceous salt from an aqueous medium having dispersed therein at least one other microingredient additive.

2. The method of claim 1 wherein the anion of the saponaceous salt is selected from saturated fatty acids, resin acids, and petroleum sulfonic acids containing between about 6 and 35 carbon atoms.

3. The method of claim 2 wherein the cation of the spanaceous salt is selected from calcium, magnesium, aluminum, barium, cadmium, lead, tin and zinc ions.

4. The method of claim 3 wherein at least one of the other microingredient additives is a liquid at a temperature below about 100°C.

5. The method of claim 1 wherein at least one of the other microingredient additives is dispersed in the molten saponaceous acid and the said molten acid is then gradually added to a stirred aqueous dispersion containing a basic compound of the saponaceous cation.

6. The method of claim 3 wherein at least one of the other microingredient additives is polymeric in structure.

7. The method of claim 1 wherein at least one microingredient is added to the aqueous medium after precipitation of the saponaceous salt but before the granular precipitate is separated from the aqueous medium.

8. The method of preparing a granular and substantially homogeneous polyfunctional additive for vinyl-based polymers which comprises precipitating a water-insoluble saponaceous salt which is capable of functioning as a lubricant in vinyl-based polymers, from an aqueous medium having dispersed therein at least one other microingredient additive for vinyl-based polymers, to coalesce and bind said saponaceous salt and other microingredient into a substantially homogeneous granular product.

9. The method of claim 8 wherein the saponaceous salt contains between about 6 and 35 carbon atoms.

10. The mehtod of claim 9 wherein the anion of the saponaceous sale is selected from fatty acids, resin acids and petroleum sulfonic acids.

11. The method of claim 10 wherein the cation of the saponaceous salt is selected from calcium, magnesium, aluminum, barium, cadmium, lead, tin and zinc ions.

12. The method of claim 11 wherein the vinyl-based polymer is polyvinyl chloride.

* * * * *